US007629732B2

(12) United States Patent

Choi et al.

(10) Patent No.: US 7,629,732 B2
(45) Date of Patent: Dec. 8, 2009

(54) CATHODE RAY TUBE HAVING A SCATTER-PROOF BAND

(75) Inventors: Sang-Shin Choi, Suwon-si (KR); Chang-Ryon Byon, Suwon-si (KR); Soon-Cheol Shin, Suwon-si (KR); Joon-Soo Bae, Suwon-si (KR); Hyung-Seok Oh, Suwon-si (KR); Seok-Nam Lee, Suwon-si (KR); Jong-Heon Kim, Suwon-si (KR); Jeong-Hoon Kim, Suwon-si (KR); Hoo-Deuk Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 672 days.

(21) Appl. No.: 11/366,503

(22) Filed: Mar. 3, 2006

(65) Prior Publication Data

US 2006/0197431 A1 Sep. 7, 2006

(30) Foreign Application Priority Data

Mar. 4, 2005 (KR) ..................... 10-2005-0018339

(51) Int. Cl.
*H01J 29/82* (2006.01)
*H04N 5/65* (2006.01)

(52) U.S. Cl. ....................................... 313/482; 348/822

(58) Field of Classification Search ................ 313/482, 313/402; 348/822
See application file for complete search history.

(56) References Cited

U.S. PATENT DOCUMENTS

| | | | | |
|---|---|---|---|---|
| 5,057,929 | A * | 10/1991 | Hermann | 348/822 |
| 6,404,121 | B1 * | 6/2002 | Goto et al. | 313/479 |
| 6,741,022 | B2 * | 5/2004 | Lee et al. | 313/479 |
| 6,924,591 | B1 * | 8/2005 | Woo et al. | 313/477 R |
| 2004/0104661 | A1 * | 6/2004 | Kang | 313/402 |
| 2006/0186784 | A1 * | 8/2006 | Bae et al. | 313/479 |

FOREIGN PATENT DOCUMENTS

| | | |
|---|---|---|
| JP | 05-144387 | 6/1993 |
| JP | 2003-151470 | 5/2003 |

* cited by examiner

*Primary Examiner*—Peter Macchiarolo
(74) *Attorney, Agent, or Firm*—Robert E. Bushnell, Esq.

(57) ABSTRACT

A cathode ray tube includes a tube having a panel having an inner phosphor screen, a funnel connected to the panel, a neck connected to the funnel, a deflection unit disposed around the funnel, an electron gun installed in the neck, and a scatter-proof unit installed on the panel and the funnel such that the panel shares the scatter-proof unit with the funnel for preventing the tube from breaking and scattering into many pieces.

15 Claims, 3 Drawing Sheets

CATHODE RAY TUBE HAVING A SCATTER-PROOF BAND

CLAIM OF PRIORITY

This application makes reference to, incorporates the same herein, and claims all benefits accruing under 35 U.S.C. §119 from an application for CATHODE RAY TUBE, earlier filed in the Korean Intellectual Property Office on 4 Mar. 2005 and there duly assigned Serial No. 10-2005-0018339.

BACKGROUND OF THE INVENTION

1. Field of the Invention

The present invention relates to a cathode ray tube (CRT), and more particularly, to a CRT that can prevent a glass tube thereof from scattering into pieces when the glass tube is broken or cracked.

2. Description of the Related Art

Generally, a typical CRT includes a glass tube having a panel, a funnel and a neck. The glass tube is evacuated to be in a vacuum state so that electrons emitted from the electron gun can excite phosphors formed on an inner surface of the panel to realize the desired images.

When a mechanical or thermal impact is applied to the CRT under the atmospheric pressure, the glass tube of the CRT may be cracked or broken into many small pieces that scatter.

The scattering of the small pieces of the broken glass tube may be from the side of the panel or the side of the funnel depending on the shape of the glass tube or the stress applied to the glass tube.

In order to solve such a problem, a shrinkage band having a predetermined tension is installed on a skirt of the panel considering that the stress is concentrated on the skirt of the panel. With this structure, when the skirt is cracked by the mechanical or thermal impact, the shrinkage band prevents the cracks from progressing to other portions, thereby preventing the glass tube from breaking and scattering into the small pieces.

Recently, the CRTs have been developed to be slimmer so that they can compete with flat displays such as a plasma display panel (PDP), a liquid crystal display (LCD) or an organic light emitting diode (OLED). In this case, the length of the funnel is reduced as compared to that of the conventional CRT and thus the stress distribution of the glass tube varies.

Accordingly, when the mechanical or thermal impact is applied to the slimmed CRT, the funnel may be cracked due to the varied stress distribution of the glass tube. Therefore, the small pieces of the cracked funnel are liable to scatter toward the panel.

Since the shrinkage band is mounted on only the skirt of the panel, it cannot sufficiently prevent the cracked funnel from breaking and scattering into the small pieces.

Alternatively, efforts have been made to prevent the glass tube from cracking and scattering into the small pieces by attaching a film to the panel. However, such a film is not enough to prevent the scattering of the glass pieces created by the cracked funnel. Furthermore, the film is expensive, thereby increasing the manufacturing costs of the CRT.

SUMMARY OF THE INVENTION

It is an object of the present invention to provide a CRT that can prevent a glass tube from scattering into many small pieces when the glass tube is cracked from a funnel side as well as a panel side by an external impact.

According to one aspect of the present invention, there is provided a CRT (Cathode Ray Tube) including: a tube having a panel having an inner phosphor screen, a funnel connected to the panel, a neck connected to the funnel; a deflection unit disposed around the funnel; an electron gun installed in the neck; and a scatter-proof unit installed on the panel and the funnel such that the panel shares the scatter-proof with the funnel for preventing the tube from breaking and scattering into many pieces.

The scatter-proof may include a band that is installed to tightly contact the outer circumferences of the panel and the funnel while covering a seal portion between the panel and the funnel.

The band may be partly formed in a multi-layer structure and the multi-layered portion of the band may be disposed on the panel.

The band may be divided into two sections respectively disposed on the panel and the funnel.

A width of a portion of the band, which is disposed on the panel, may be greater than that of a portion of the band, which is disposed on the funnel.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention is described more fully hereinafter with reference to the accompanying drawings, in which exemplary embodiments of the present invention are shown.

Figure 1:
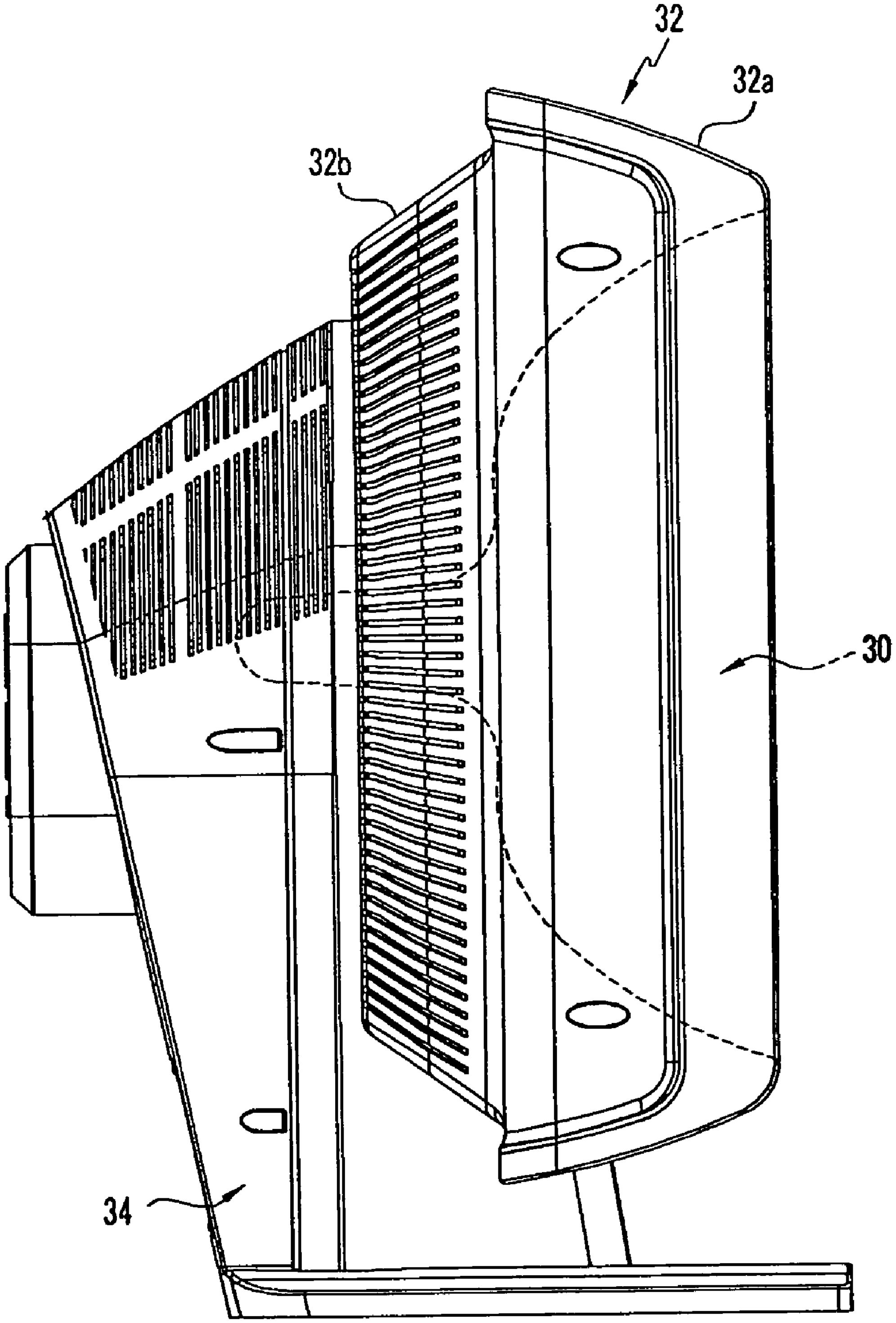
FIG. 1 is a side view of a display device to which a CRT according to an embodiment of the present invention is applied.

FIG. 1 is a side view of a display device to which a CRT according to an embodiment of the present invention is applied;

As shown in FIG. 1, the display device includes a CRT 30 for displaying images, a case 32 surrounding the CRT 30 and defining an outer appearance of the device and a support 34 connected to the case 32 to support the case 32.

The case 32 includes front and back cases **32*a* and 32*b* disposed at the front and rear of the CRT 30 and coupled to each other by, for example, screws or other fastening unit. The support 34** is formed into a stand.

The CRT 30 is placed in the case 32 and the neck of the CRT 30 is disposed inside the support 34.

Figure 2:
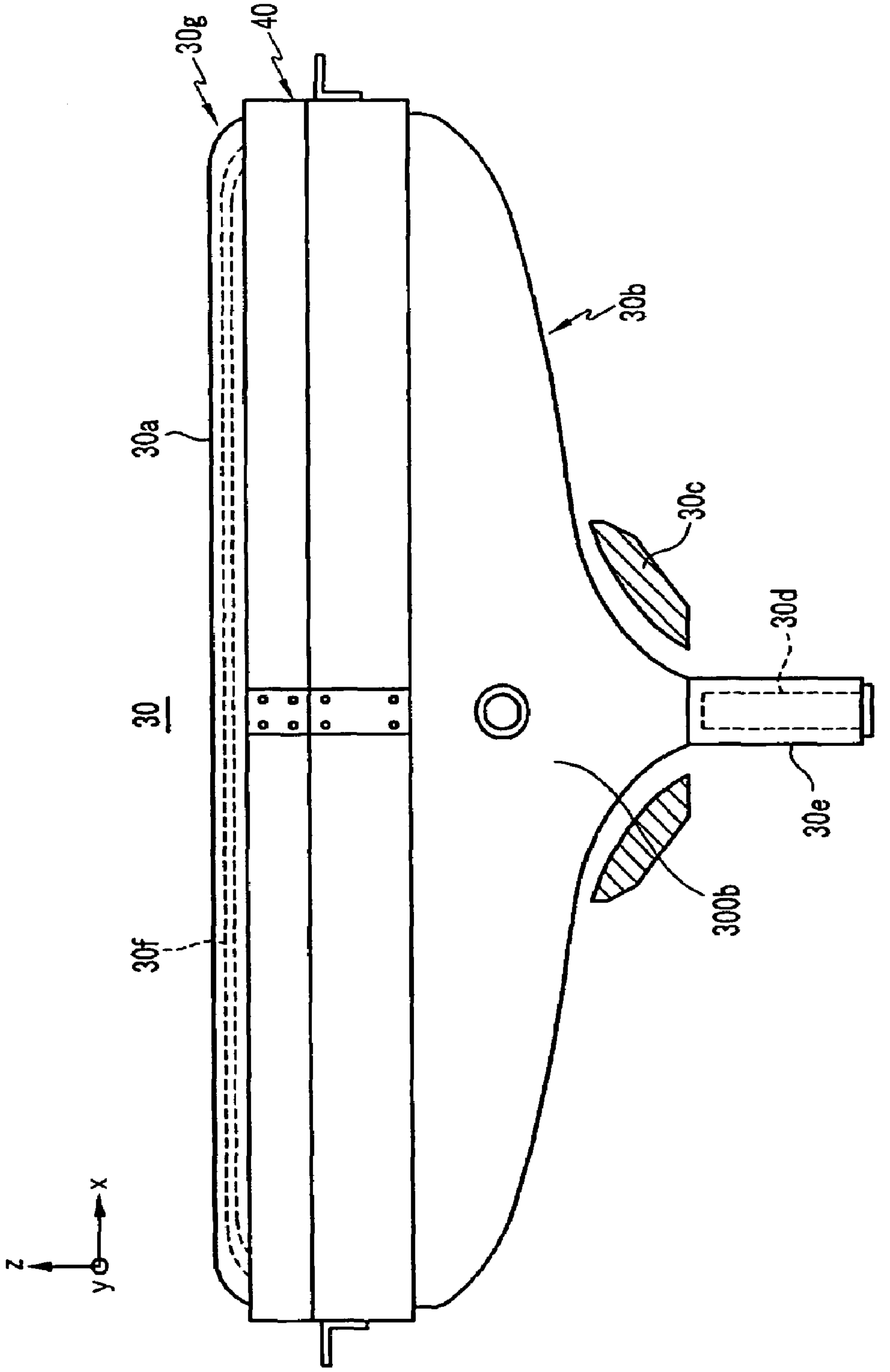
FIG. 2 is a top view of a CRT according to an embodiment of the present invention.
Figure 3:
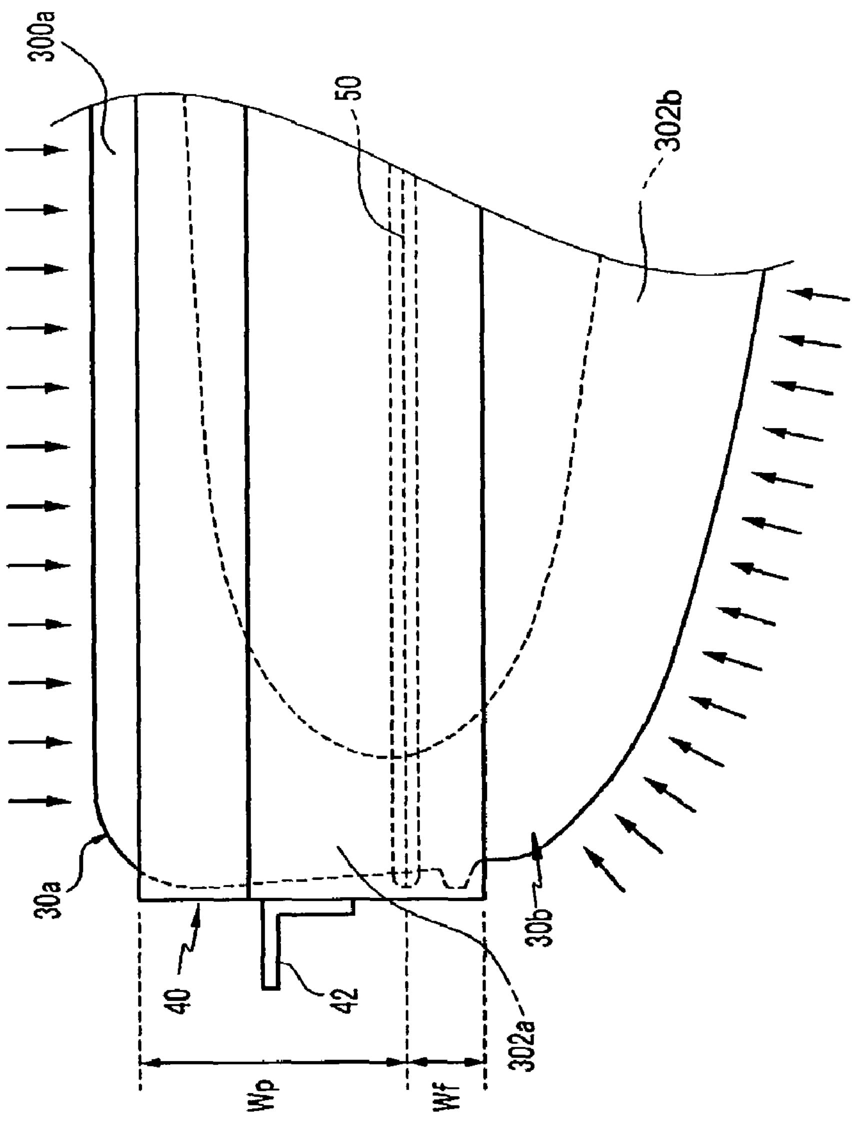
FIG. 3 is an enlarged view of a major portion of the CRT depicted in FIG. 2.

FIG. 2 is a top view of the CRT 30 and FIG. 3 is a partially-enlarged view of the CRT 30.

Referring to FIG. 2, the CRT 30 includes a glass tube **30*g* having a rectangular panel 30*a* on an inner surface of which a phosphor screen 30*f* is formed, a funnel 30*b* connected to the panel 30*a* and a neck 30*e* connected to the rear end of a cone portion 300*b* of the funnel 30*b*. In addition, a deflection unit 30*c* is disposed on the outer circumference of the cone portion 300*b* and an electron gun 30*d* is installed in the neck 30*e***.

In this current embodiment, the panel 30*a* includes a face 300*a* having a predetermined size and a skirt 302*a* extending inward from an edge of the face 300*a*. The face 300*a* has an outer surface that is substantially flat and an inner surface that is curved by a predetermined curvature.

The funnel 30*b* includes a body 302*b* extending from the cone portion 300*b* and connected to the skirt 302*a*.

The tube 30*g* is internally kept in a vacuum state and electron beams emitted from the electron gun 30*d* are deflected by the deflection unit 30*c* in the directions of the horizontal and vertical-axes (x and y-axes in FIG. 2) of the panel 30. The deflected electron beams pass through beam apertures of a color selection unit (not shown) mounted inside the panel 30*a* and land on target phosphors of the phosphor screen 30*f*, thereby realizing the desired images.

When a mechanical or thermal impact is applied from an external side to the CRT 30, the tube 30*g* is cracked. When the cracks propagate in the tube 30*g*, the tube 30*g* breaks and scatters into many small pieces. To prevent this, the CRT 30 of this embodiment is designed as described below.

As shown in FIGS. 2 and 3, a scatter-proof unit 40 is provided on the tube 30*g* of the CRT 30 to prevent the tube 30*g* from scattering.

The panel 30*a* shares the scatter-proof unit 40 with the funnel 30*b*. That is, the scatter-proof unit 40 includes a band that is installed to tightly contact the outer circumferences of the panel 30*a* and the funnel 30*b*.

At this point, the scatter-proof unit 40 is arranged to cover a frit seal portion 50 between the panel 30*a* and the funnel 30*b*.

That is, in the present invention, in order to reduce moment of a force that is applied to the frit seal portion 50 when the tube 30*a* receives the atmospheric pressure (see arrows of FIG. 3), the scatter-proof unit 40 is arranged along the outer circumference of the panel 30*a* as well as the outer circumference of the funnel 30*b*. Here, the scatter-proof unit 40 may be formed of metal or other materials.

The arrangement of the scatter-proof unit 40 is determined considering that an outer curvature of the funnel 30*b* of the slimmed CRT is less than that of the conventional CRT.

In this embodiment, likewise the shrinkage band of the conventional CRT, after the scatter-proof unit 40 is arranged on the funnel and tube and opposite ends of the scatter-proof unit 40 are coupled to each other by, for example, welding or other fasteners.

At this point, the scatter-proof unit 40 may be partly formed in a multi-layer structure. In this embodiment, a portion of the scatter-proof unit 40, which is arranged on a portion of the panel 30*a*, is formed in a dual-layer. However, the present invention is not limited to this structure. That is, the scatter-proof unit 40 may be designed in a variety of structures according to characteristics of the CRT to which the scatter-proof unit 40 is applied.

In this embodiment, a width Wp of a corresponding portion of the scatter-proof unit 40 to the panel 30*a* is greater than that width Wf of a corresponding portion of the scatter-proof unit 40 to the funnel 30*b*. The width Wp can be for example the distance from the frit seal portion 50 to the end of the scatter proof unit 40 corresponding to the panel 30*a* and width Wf can be for example the distance from the frit seal portion 50 to the end of the scatter proof unit 40 corresponding to the funnel 30*b* as seen in FIG. 3. However, the present invention is not limited to this case. That is, the widths Wp and Wf may be properly adjusted according to the characteristics of the CRT to which the scatter-proof unit 40 is applied.

In addition, although the scatter-proof unit 40 is formed in a single body in this embodiment, the present invention is not limited to this case. That is, the scatter-proof unit 40 may be divided into two sections respectively disposed on the panel 30*a* and the funnel 30*b*.

Meanwhile, ears 42 for fixing the tube 30*g* on the case (32 of FIG. 1) are fixed on the single layer portion of the scatter-proof unit 40.

With the above-described CRT, even when the moment of a force is generated on the frit seal portion 50 by the atmospheric pressure applied to the panel 30*a* and the funnel 30*b*, the intensity of the moment can be reduced by the scatter-proof member 40 that tightly holds and contacts the panel 30*a* as well as the funnel 30*b*.

Therefore, the CRT of the present invention can be improved in an explosion-proof property even when it is formed to be slimmer, thereby being improved in its quality.

A stress applied to the body of the funnel of the CRT to which the scatter-proof unit is applied was tested and it was noted through the test result that it is preferable that the scatter-proof unit meets the following condition.

$$0.03 \leqq Wf/(Wp+Wf) < 0.35$$

That is, the stress applied to the body of the funnel was tested while the width Wf of a portion of the scatter-proof unit, which is disposed on the funnel, varies in a state where the width Wp of a portion of the scatter-proof, which is disposed on the panel, is fixed. When the width Wf was equal to or more than 3% of the overall width (Wp+Wf) and less than 35% of the overall width (Wp+Wf), a reliable stress distribution (less than 9 Mpa) was formed on the body of the funnel.

Moreover, it was also noted that it is more preferable that the scatter-proof unit fulfills the following condition.

$$0.08 \leqq Wf/(Wp+Wf) \leqq 0.27$$

In particular, it was further noted that it is most preferable that Wf/(Wp+Wf) is 0.166.

As described above, with the CRT in accordance with the present invention, even though it is formed to be slimmer in response to the taste of the consumers, the scattering of the small pieces of the tube in the presence of cracks can be effectively prevented due to the operation of the scatter-proof unit formed on the tube as well as on the funnel. Therefore, the reliability and explosion-proof property of the CRT can be improved.

Although exemplary embodiments of the present invention have been described in detail hereinabove, it should be clearly understood that many variations and/or modifications of the basic inventive concept herein taught which can appear to those skilled in the art will still fall within the spirit and scope of the present invention, as defined in the appended claims.

What is claimed is:

1. A cathode ray tube having a panel and a funnel coupled to a rear side of the panel, the cathode ray tube including a scatter-proof unit formed around a portion of said panel and a portion of said funnel, said scatter-proof unit having a total width Wp+Wf, where Wp is the width of a portion of the scatter-proof unit formed around the panel and Wf is the width of a portion of the scatter-proof unit formed around the funnel, such that the condition $0.03 \leqq Wf/(Wp+Wf) < 0.35$ is satisfied.

2. The cathode ray tube as set forth in claim 1, wherein said scatter-proof unit includes a band in tight contact the outer circumferences of both the panel and the funnel.

3. The cathode ray tube as set forth in claim 1, wherein said scatter-proof unit includes a band having a multi-layer structure.

4. The cathode ray tube as set forth in claim 2, wherein said band has a multi-layer structure.

5. The cathode ray tube as set forth in claim 1, further comprising a frit seal coupling said panel to said funnel.

6. A cathode ray tube having a panel and a funnel coupled to a rear side of the panel, the cathode ray tube including a scatter-proof unit formed around a portion of said panel and a portion of said funnel, said scatter-proof unit having a total width Wp+Wf, where Wp is the width of a portion of the scatter-proof unit formed around the panel and Wf is the width of a portion of the scatter-proof unit formed around the funnel, such that the condition $0.08 \leqq Wf/(Wp+Wf) < 0.27$. is satisfied.

7. The cathode ray tube as set forth in claim 6, wherein said scatter-proof unit includes a band in tight contact the outer circumferences of both the panel and the funnel.

8. The cathode ray tube as set forth in claim 6, wherein said scatter-proof unit includes a band having a multi-layer structure.

9. The cathode ray tube as set forth in claim 7, wherein said band has a multi-layer structure.

10. The cathode ray tube as set forth in claim 6, further comprising a frit seal coupling said panel to said funnel.

11. A cathode ray tube having a panel and a funnel coupled to a rear side of the panel, the cathode ray tube including a scatter-proof unit formed around a portion of said panel and a portion of said funnel, said scatter-proof unit having a total width Wp+Wf, where Wp is the width of a portion of the scatter-proof unit formed around the panel, Wf is the width of a portion of the scatter-proof unit formed around the funnel, Wp>Wf and Wf/(Wp+Wf) is 0.166.

12. The cathode ray tube as set forth in claim 11, wherein said scatter-proof unit includes a band in tight contact the outer circumferences of both the panel and the funnel.

13. The cathode ray tube as set forth in claim 11, wherein said scatter-proof unit includes a band having a multi-layer structure.

14. The cathode ray tube as set forth in claim 12, wherein said band has a multi-layer structure.

15. The cathode ray tube as set forth in claim 11, further comprising a frit seal coupling said panel to said funnel.

* * * * *